United States Patent
Solorio et al.

(10) Patent No.: US 7,094,437 B2
(45) Date of Patent: Aug. 22, 2006

(54) REDUCED-CALORIE FREEZABLE BEVERAGE

(75) Inventors: Hector A. Solorio, East Amherst, NY (US); Dennis Flahive, Buffalo, NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 10/628,383

(22) Filed: Jul. 29, 2003

(65) Prior Publication Data

US 2004/0137126 A1 Jul. 15, 2004

Related U.S. Application Data

(60) Provisional application No. 60/399,437, filed on Jul. 31, 2002.

(51) Int. Cl.
  *A23G 9/00* (2006.01)
  *A23L 2/00* (2006.01)

(52) U.S. Cl. .................... 426/565; 426/590; 426/599; 426/602; 426/650

(58) Field of Classification Search ............... 426/565, 426/590, 599, 602, 650
See application file for complete search history.

(56) References Cited

U.S. PATENT DOCUMENTS

| | | | | |
|---|---|---|---|---|
| 3,843,805 A | | 10/1974 | Powell | 426/92 |
| 3,922,361 A | * | 11/1975 | Vann | 426/599 |
| 4,609,561 A | * | 9/1986 | Wade et al. | 426/565 |
| 4,748,033 A | * | 5/1988 | Syfert et al. | 426/330.3 |
| 5,069,924 A | * | 12/1991 | Baccus, Jr. | 426/590 |
| 5,077,075 A | * | 12/1991 | Wade | 426/564 |
| 5,246,725 A | * | 9/1993 | Fisher et al. | 426/565 |
| 5,980,869 A | | 11/1999 | Sanker et al. | 424/58 |
| 6,139,895 A | * | 10/2000 | Zablocki et al. | 426/573 |
| 6,180,159 B1 | * | 1/2001 | Villagran et al. | 426/590 |
| 6,468,576 B1 | | 10/2002 | Sher et al. | 426/565 |
| 6,551,646 B1 | * | 4/2003 | Baker | 426/565 |
| 2002/0197371 A1 | * | 12/2002 | Lee et al. | 426/548 |
| 2002/0197376 A1 | * | 12/2002 | Broz | 426/565 |

FOREIGN PATENT DOCUMENTS

| | | | |
|---|---|---|---|
| DE | 201 21 027 | | 7/2002 |
| EP | 0 268 097 | | 5/1988 |
| EP | 1 210 880 | * | 6/2002 |
| GB | 2 130 070 | * | 5/1984 |
| GB | 2 027 447 | | 2/1998 |
| WO | WO 96/37120 | * | 11/1996 |
| WO | WO 97/33813 | | 9/1997 |
| WO | WO 97/43913 | | 11/1997 |
| WO | WO 02/085130 | * | 10/2002 |

OTHER PUBLICATIONS

Patent Abstracts of Japan, vol. 11, No. 47, Feb. 13, 1987 & JP 61-212273 A 9AJinomoto General Food KK), Sep. 20, 1986.

* cited by examiner

*Primary Examiner*—N. Bhat
(74) *Attorney, Agent, or Firm*—Kenyon & Kenyon LLP

(57) ABSTRACT

It has now been found that reduced-calorie, freezable beverages can be made using a small amount of alcohol and a reduced amount of sorbitol or other soluble solids. Surprisingly, one embodiment of the invention is a reduced-calorie, freezable beverage that can be adequately slushed using a standard soft-serve ice cream machine. Freezable coffee beverages and fruit beverages that are reduced-calorie, sugar-free, and low-fat are preferred embodiments of the invention.

32 Claims, No Drawings

REDUCED-CALORIE FREEZABLE BEVERAGE

CROSS-REFERENCE TO RELATED APPLICATIONS

This application claims priority under 35 U.S.C. § 119(e) to application Ser. No. 60/399,437, filed Jul. 31, 2002 which is incorporated herein by reference in its entirety.

FIELD OF THE INVENTION

The invention relates to reduced-calorie, freezable beverages and sugar-free creamers that can be used therewith.

BACKGROUND OF THE INVENTION

There is great demand for products that are low-calorie, low sugar (or sugar-free), and/or low fat. Manufacturing "frozen" drinks with such properties, however, has not yet been successfully achieved.

Commercially available frozen coffee drinks, for example, are typically made using a coffee concentrate that is diluted with water then "slushed" in a machine, such as a soft-serve ice cream machine. The product can then be consumed alone or with a creamer.

These soft-serve ice cream machines typically require a minimum of 11–12° Brix. Brix is the percentage of soluble solids, which are commonly sugars. A high Brix value is associated with depressing the freezing point of the beverage. Typically, a low molecular weight sugar alcohol, such as sorbitol, is added to depress the freezing point of the beverage. Unfortunately, however, sorbitol adds a substantial amount of calories to the beverage. Thus, there is a need for a palatable frozen beverage that is low in calories.

SUMMARY OF THE INVENTION

Beverage concentrates, freezable beverages, and frozen beverages are described. A preferred embodiment of the invention is a 3x concentrate comprising about 0.01 to about 0.4% by weight high-potency sweetener, about 1 to about 30% by weight flavoring, about 1 to about 35% by weight sugar substitute, and, about 1 to about 12% by weight alcohol, wherein the concentrate has less than about 33° Brix. Preferred embodiments also contain about 0.01 to about 3% texture modifier.

DETAILED DESCRIPTION OF THE INVENTION

The invention is directed to freezable beverages, such as frozen coffee or tea drinks, smoothies, slushies, bar mixes, ice cream products, and the like; as used herein, the term "beverage" is used broadly to cover these types of products. As used herein, the term "fruit" includes fruit solids and fruit juice.

One embodiment of the invention is a 3x concentrate that can be diluted and slushed prior to consumption. The concentrate contains water, a sweetener (preferably a reduced-calorie and/or high potency sweetener such as Sucralose, Acesulfame K, Aspartame, Neotame, Saccharin, etc.), a sugar substitute (such as polyols such as sorbitol, lactitol, maltitol, xylitol, mannitol, etc.), and one or more consumable alcohols (preferably ethanol). Generally, the concentrate will also contain flavoring agents (such as fruit, coffee extracts, tea extracts, etc.), coloring agents (such as caramel color), and texture modifiers (such as carboxymethylcellulose, pectin, carrageenan, guar gum, locust bean gum, xanthan gum, etc.) to control ice crystal growth and/or to modify texture. Other common ingredients that can be used are those well known in the art, such as antifoam agents.

Preferably, the 3x concentrate contains about 0.01–0.4% high potency sweetener, preferably about 0.02–0.4%, preferably about 0.03–0.2%, preferably about 0.05–0.2%; about 1–30% flavoring, preferably about 2–18%, preferably about 2–15%; about 1–35% sugar substitute, preferably about 1–32%, preferably about 1 to about 25%, preferably about 1 to about 9%, preferably about 1 to about 4%; about 0.3–12% alcohol, preferably about 1–10%, preferably about 1 to about 6% (for alcoholic beverages, preferably about 4–10%; for non-alcoholic beverages, preferably less than about 3%, preferably less than about 1.5%).

In a preferred coffee-flavored embodiment of the 3x concentrate, the flavoring comprises coffee extract. In addition, a preferred coffee-flavored embodiment contains preferably about 0.0001–0.001% antifoam agent, preferably about 0.0002–0.0006%; preferably about 0.01–3% texture modifier, preferably about 0.08–0.5%, and/or preferably up to about 1% salt, preferably up to about 0.6%. As used herein, "salt" refers to edible salts, preferably sodium chloride.

In a preferred smoothie embodiment, a 2x concentrate preferably contains about 0.01–0.4% high potency sweetener, preferably about 0.02–0.4%, preferably about 0.02–0.2%, preferably about 0.05–0.2%; about 1–60% fruit, preferably about 3–40%, preferably about 12–22%; about 1–25% sugar substitute, preferably about 2 to about 10%; about 0.2–12% alcohol, preferably about 1–10% (for alcoholic beverages, preferably about 4–10%; for non-alcoholic beverages, preferably less than about 3%, preferably less than about 1.5%). In a particularly preferred smoothie embodiment preferably contains about 0.01–3% texture modifier, preferably about 0.02–0.1%; preferably about 0.01–1% salt, preferably about 0.02–1%; and/or preferably about 0.05–2% additional flavoring, preferably about 0.1–1.2%.

Alternatively, the concentrate could range from just over 1x to 5x or greater. The relative amounts of each ingredient could be easily recalculated accordingly.

Preferably, the concentrate is aseptically manufactured and shelf-stable at room temperature until opened when ready for use.

Another embodiment of the invention is a freezable beverage comprising a concentrate that has been diluted to a palatable beverage. For a 3x concentrate, 1 part concentrate would be added to about 2 parts water. The freezable beverage comprises an effective amount of alcohol to produce a beverage that can be slushed using machines commonly used in the art for such purpose. Preferably, the amount of alcohol is about 0.2–1%. For some applications, the amount of alcohol used is preferably less than 0.5%, thereby qualifying the product as "alcohol free" according to certain governmental regulations. However, if the freezable beverage is intended as an alcoholic beverage, then more than 0.5% alcohol may be desirable.

Generally, within the alcohol range of 0–0.5%, the higher part of this range is preferred because less other soluble solids, such as sugar alcohols, is then required to achieve adequate slushing. Preferably, a coffee beverage embodiment, for example, contains about 0.1–0.5% alcohol, more preferably about 0.2–0.5% alcohol, more preferably about 0.3–0.5%.

Preferred embodiments of the freezable beverage of the invention are low in calories, preferably less than 12.5 calories/oz, more preferably less than about 10 calories/oz, more preferably less than about 8 calories/oz, more preferably about 7 calories/oz or less.

Typically, the low-calorie, freezable beverage will have a low Brix value, such as less than about 10° Brix, preferably less than about 7° Brix, and more preferably as low as 3° Brix or lower. Advantageously, a freezable beverage with a lower Brix value is generally lower in calories. Surprisingly, a preferred embodiment of the invention has a lower Brix value than the equipment manufacturer's assumptions for what is required to produce an adequate slush in their equipment, which is generally at least 11–12° Brix. Preferably, the various composition embodiments of the invention are made aseptically.

Another embodiment of the invention is a creamer, preferably sugar-free, that can be mixed with the freezable beverage. The freezable beverage, however, can be used alone or with other creamers. The use of skim milk, for example, would largely retain the benefit of a low calorie product. Preferably, 1 part creamer is mixed with about 3 parts slushed beverage.

Preferably, the creamer contains water; about 0.1–10% emulsifier, more preferably about 2.5–5%; about 0.001–2% stabilizer, more preferably about 0.02–1%; about 1–15% sweetener (preferably a sugar substitute), more preferably about 3–8%; about 0.01–25% fat, preferably about 0.01–12%, more preferably about 0.1–3%. In a preferred embodiment, the creamer also contains 0.0001–0.01% antifoam agent, more preferably 0.0002–0.005%; about 0.001–1.0 flavoring, more preferably 0.01–0.2%; and about 0.01–0.8% stabilizer salt; more preferably about 0.03–0.1%.

Suitable emulsifiers include, for example, mono and diglycerides, sodium stearoyl lactylate, sucrose esters, DATEM, or other known emulsifiers. Suitable sugar substitutes include, for example, Sucralose, Acesulfame K, Neotame, Aspartame, Saccharin, etc. Suitable fats include animal-based fats, such as butterfat, or, preferably, vegetable oils, such as palm kernel oil, butterfat, coconut oil, soybean oil, canola oil, sunflower oil, etc. Other common ingredients that can be used are those well known in the art, such as antifoam agents and salts.

The present invention will now be described in detail with respect to showing how certain specific representative embodiments thereof may be made, apparatus and process steps being understood as examples that are intended to be illustrative only. In particular, the invention is not intended to be limited to the methods, ingredients, conditions, process parameters, apparatus and the like specifically recited herein.

EXAMPLE 1

Coffee 3× Concentrate

| INGREDIENT | % wt |
| --- | --- |
| Water | 63.5353 |
| Sucralose (25% Solution) | 0.1846 |
| Coffee Extract | 10.8532 |
| Coffee Expresso Extract | 0.4193 |
| Chocolate Flavor | 0.2098 |
| Caramel Color | 1.3962 |
| Antifoam Dow Corning | 0.0004 |
| Sorbitol (70% solution) | 17.5650 |
| Natural flavor (21% alcohol by volume) | 5.7144 |

-continued

| INGREDIENT | % wt |
| --- | --- |
| CMC | 0.1218 |
| TOTAL | 100.0000 |

The water (cold) was mixed with the carboxymethylcellulose (CMC) in a high shear mixer. This slurry was added to all of the other ingredients which are mixed at room temperature. Sweep mixer at 70%. The mixture, which was produced aseptically, contained about 18° Brix, about 1.2% alcohol, and about 22 calories per fluid ounce.

EXAMPLE 2

Sugar-Free Creamer

| INGREDIENT | % wt |
| --- | --- |
| Water | 89.1414 |
| PKO | 2.3189 |
| Antifoam Powdered | 0.0016 |
| Sodium Caseinate (as premix) | 3.5981 |
| Carrageenan (as premix) | 0.0400 |
| Sorbitol (70% solution) | 4.6480 |
| Condensed Milk flavor | 0.0280 |
| Milk flavor | 0.0280 |
| Emplex (as premix) | 0.1000 |
| Dimodan monoglycerides (as premix) | 0.0300 |
| Disodium Phosphate (as premix) | 0.0660 |
| TOTAL | 100.0000 |

The mixing procedure is as follows: Add water at 150–160° F.; sweep mixer at 70%; high shear off. Maintain temperature above 140° F. Add palm kernel oil with same mixing as above. Add antifoam with same mixing as above. 3.8342% of a premix (the final percentages shown above) is very slowly sprinkled into the mix. This can be added with the sorbitol. Sweep mixer 70%; high shear mixer 80%; temperature 140–155° F. The product must be mixed until lumps are completely gone. When the product is thoroughly mixed, turn the high shear mixer off and reduce the sweep mixer to 60%. Hold mix at 140–165° F. for no more than 2 h. The mixture, which was made aseptically, contained about 7° Brix and about 15 calories per fluid ounce.

EXAMPLE 3

Frozen Coffee Beverage

A frozen coffee beverage was prepared by diluting 1 part of the concentrate from Example 1 with 2 parts water. The mixture was then added to a soft-serve ice cream machine and slushed according to the normal operating guidelines for the machine. The product formed a semi-liquid slush that could be easily dispensed using the standard dispensing valves of the machine. The mixture contained about 6° Brix, about 0.5% alcohol, and about 7 calories per fluid ounce.

EXAMPLE 4

Coffee 3× Concentrate

| INGREDIENT | % wt |
| --- | --- |
| Water | 74.1795 |
| Sucralose (25% Solution) | 0.18 |
| Coffee Extract | 10.87 |
| Coffee Flavor | 0.25 |
| Caramel Color | 1.4 |
| Antifoam Dow Corning | 0.0005 |
| Sorbitol (70% solution) | 3.0 |
| Natural flavor (21% alcohol by volume) | 10.0 |
| CMC cellulose gum | 0.12 |
| TOTAL | 100 |

The coffee concentrate was prepared by the method described in Example 1. The mixture contained about 9° Brix, about 2.1% alcohol, and about 12 calories per fluid ounce.

EXAMPLE 5

Frozen Coffee Beverage

A frozen coffee beverage was prepared by diluting 1 part of the concentrate from Example 4 with 2 parts water. The mixture was then added to a Taylor-type soft-serve ice cream machine and slushed according to the normal operating guidelines for the machine. The product formed a semi-liquid slush that could be easily dispensed using the standard dispensing valves of the machine. The mixture contained about 3° Brix, about 0.7% alcohol, and about 4 calories per fluid ounce.

EXAMPLE 6

Strawberry 2× Concentrate

| INGREDIENT | % wt |
| --- | --- |
| Water | 66.81 |
| Sucralose (25% Solution) | 0.08 |
| Strawberry mixture | 20.0 |
| (80% strawberries, 20% sucrose) | |
| Sodium chloride | 0.04 |
| Sorbitol (70% solution) | 3.0 |
| Natural flavor (21% alcohol by volume) | 10.0 |
| CMC cellulose gum | 0.07 |
| TOTAL | 100 |

The strawberry concentrate was prepared by the method described in Example 1, except all mixing was done with a sweep mixer without high shear. The concentrate can be prepared aseptically. The mixture contained about 11° Brix, about 2.1% alcohol, and about 14 calories per fluid ounce.

EXAMPLE 7

Frozen Strawberry Smoothie

A frozen strawberry smoothie beverage was prepared by diluting 1 part of the concentrate from Example 6 with 1 part water. The mixture was then added to a Bunn smoothie machine and slushed according to the normal operating guidelines for the machine. The product formed a semi-liquid slush that could be easily dispensed using the standard dispensing valves of the machine. The mixture contained about 5.5° Brix, about 1.05% alcohol, and about 7 calories per fluid ounce.

What is claimed is:

1. A 3× concentrate comprising:
   about 0.01 to about 0.4% by weight high-potency sweetener;
   about 1 to about 30% by weight flavoring;
   about 1 to about 32% by weight sugar substitute;
   about 0.3 to about 12% by weight ethanol,
   wherein the concentrate has less than about 32° Brix.

2. A freezable beverage comprising:
   one part of the concentrate of claim 1; and
   about two parts water,
   wherein the freezable beverage has less than about 11° Brix.

3. The 3× concentrate of claim 1, wherein the concentrate comprises:
   about 0.02 to about 0.2% by weight high-potency sweetener;
   about 2 to about 15% by weight flavoring;
   about 2 to about 25% by weight sugar substitute; and
   about 0.3 to about 9% by weight ethanol.

4. A freezable beverage comprising:
   one part of the concentrate of claim 3; and
   about two parts water,
   wherein the freezable beverage has less than about 11° Brix.

5. A frozen beverage comprising the beverage of claim 4 in frozen form.

6. The beverage of claim 4, wherein the beverage further comprises about 0.01 to about 3% texture modifier.

7. The beverage of claim 6, wherein the beverage comprises about 0.03 to about 0.5% texture modifier.

8. The beverage of claim 4, wherein the beverage contains about 0.1 to about 2% ethanol.

9. The beverage of claim 8, wherein the beverage contains about 0.2 to about 1% ethanol.

10. The beverage of claim 9, wherein the beverage contains about 0.3 to about 0.5% ethanol.

11. The beverage of claim 4, wherein the beverage contains less than about 12.5 calories/ounce.

12. The beverage of claim 4, wherein the beverage has less than about 10° Brix.

13. The beverage of claim 12, wherein the beverage has from about 1.5° Brix to about 7° Brix.

14. The beverage of claim 4, wherein the flavoring comprises coffee extract.

15. The beverage of claim 4, further comprising up to about 0.2% salt.

16. The beverage of claim 4, wherein the beverage contains about 1 to about 9% sugar substitute and about 0.3 to about 3% ethanol.

17. The concentrate of claim 1, wherein the concentrate is non-carbonated.

18. The concentrate of claim 1, wherein the concentrate is aseptic.

19. A 2× concentrate comprising:
   about 0.002 to about 0.4% by weight high-potency sweetener;
   about 2 to about 60% by weight flavoring;
   about 1 to about 22% by weight sugar substitute;
   about 0.2 to about 12% by weight ethanol,
   wherein the beverage has less than 22° Brix.

20. The concentrate of claim 19, wherein the concentrate is aseptic.

21. A freezable beverage comprising:
about 0.001 to about 0.2% by weight high-potency sweetener;
about 1 to about 30% by weight flavoring;
about 0.5 to about 11% by weight sugar substitute; and
about 0.1 to about 6% by weight ethanol,
wherein the freezable beverage has less than 11° Brix.

22. The beverage of claim 21, wherein the beverage comprises:
about 0.001 to about 0.2% high potency sweetener;
about 1 to about 10% flavoring;
about 0.5 to about 5% sugar substitute; and
about 0.2 to about 4% ethanol.

23. The beverage of claim 22, wherein the beverage contains about 0.2 to about 1% ethanol.

24. The beverage of claim 23, wherein the beverage contains about 0.3 to about 0.5% ethanol.

25. The beverage of claim 21, wherein the beverage further comprises about 0.01 to about 3% texture modifier.

26. The beverage of claim 25, wherein the beverage comprises about 0.03 to about 0.5% texture modifier.

27. The beverage of claim 21, further comprising creamer up to about 0.2% salt.

28. The beverage of claim 21, wherein the beverage is non-carbonated.

29. A method of preparing a frozen beverage comprising slushing the freezable beverage of claim 18 in a commercial freezing machine to form a frozen drink.

30. The method of claim 29, wherein the commercial freezing machine is a soft-serve ice cream machine.

31. The method of claim 29, wherein the beverage is non-carbonated.

32. A water-based creamer comprising:
about 0.1 to about 10% emulsifier;
about 0.001 to about 2% stabilizer;
about 1 to about 15% sweetener; and
about 0.01 to about 12% fat.

* * * * *

UNITED STATES PATENT AND TRADEMARK OFFICE
CERTIFICATE OF CORRECTION

PATENT NO. : 7,094,437 B2
APPLICATION NO. : 10/628383
DATED : August 22, 2006
INVENTOR(S) : Hector A. Solorio et al.

It is certified that error appears in the above-identified patent and that said Letters Patent is hereby corrected as shown below:

In the Title Page:
Col. 1: Change "(75) Inventors: Hector A. Solorio, East Amherst, NY" to --(75) Inventors: Hector A. Solorio, Newburg, IN--.

Col. 2: Under "FOREIGN PATENT DOCUMENTS":
Change "GB 2 027 447  2/1998" to -- GB 2 027 447  2/1980--.

| Column | Line | |
|---|---|---|
| 3 | 36-37 | Replace "Sucralose, Acesulfame K, Neotame, Aspartame, Saccharin, etc." with --polyols, such as sorbitol, lactitol, maltitol, xylitol, mannitol, etc.--. |
| 8 | 3 | Delete "creamer". |
| 8 | 8 | Change "claim 18" to --claim 21--. |
| 8 | 14 | After "comprising" insert --creamer--. |

Signed and Sealed this

Twenty-seventh Day of May, 2008

JON W. DUDAS
*Director of the United States Patent and Trademark Office*